W. CROTTY.
FASTENER.
APPLICATION FILED NOV. 4, 1921.

1,434,735. Patented Nov. 7, 1922.

Inventor
W. Crotty.
By C. A. Snow & Co.
Attorneys.

Patented Nov. 7, 1922.

1,434,735

UNITED STATES PATENT OFFICE.

WILLIAM CROTTY, OF ROCKFORD, ILLINOIS.

FASTENER.

Application filed November 4, 1921. Serial No. 512,904.

*To all whom it may concern:*

Be it known that I, WILLIAM CROTTY, a citizen of the United States, residing at Rockford, in the county of Winnebago and State of Illinois, have invented a new and useful Fastener, of which the following is a specification.

The device forming the subject matter of this application is a fastener, adapted to be used in connection with collar buttons, cuff buttons, separable garment buttons, badges, breeches and, in general in connection with devices of any sort whatsoever, calling for the use of a fastener of the sort hereinafter described.

The invention aims to provide novel means for holding the head of the device on the stem thereof, securely but separably.

It is within the province of the disclosure to improve generally and to enhance the utility of devices of that type to which the invention appertains.

With the above and other objects in view, which will appear as the description proceeds, the invention resides in the combination and arrangement of parts and in the details of construction hereinafter described and claimed, it being understood that, within the scope of what is claimed, changes in the precise embodiment of the invention shown can be made without departing from the spirit of the invention.

In the accompanying drawings:—

Figure 1:
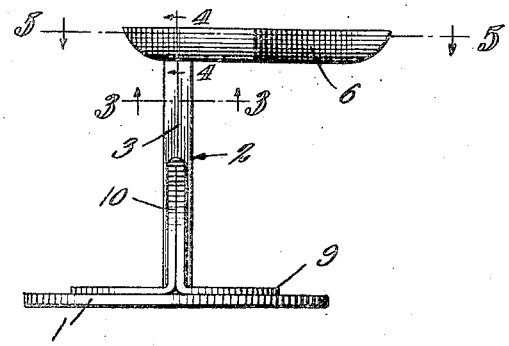
Figure 2:
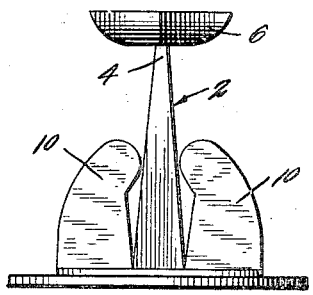
Figure 3:
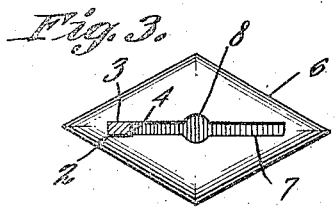
Figure 4:
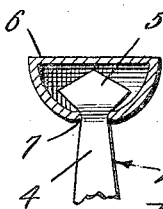
Figure 5:
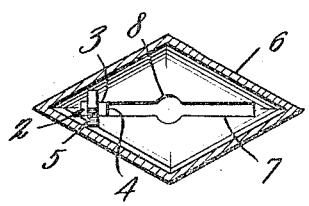
Figure 6:
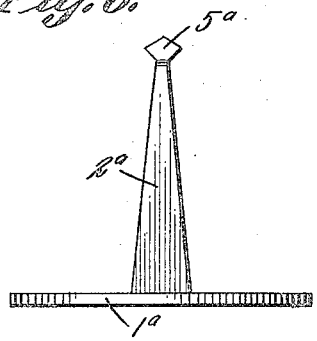
Figure 7:
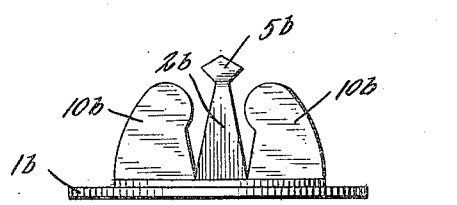

Figure 1 shows in side elevation, a device constructed in accordance with the invention; Figure 2 is a side elevation wherein the device is viewed at right angles to the showing of Figure 1; Figure 3 is a section on the the line 3—3 of Figure 1; Figure 4 is a section on the line 4—4 of Figure 1; Figure 5 is a section on the line 5—5 of Figure 1; Figure 6 is an elevation showing a modification; Figure 7 is an elevation showing another modification.

Referring to Figures 1, 2, 3, 4 and 5, the device forming the subject matter of this application is shown as comprising a base 1 from which a stem 2 projects, the stem being of rectangular cross section and of unequal transverse dimensions, the longer transverse dimension of the stem being denoted by the numeral 3, and the shorter transverse dimension of the stem being denoted by the numeral 4. The stem 2 carries a boss 5, disposed at right angles to the longer transverse dimension 3 of the stem 2.

A hollow head 6 is provided, and is supplied in its inner wall with an elongated slot 7 having intermediate its ends, an enlargement 8, the width of the slot 7 being substantially equal to the shorter transverse dimension 4 of the stem 2.

The boss 5 is insertable into the slot 7 when the stem 2 is located in the enlargement 8, with the longer transverse dimension 3 of the stem disposed at right angles to the length of the slot 7. The stem 2 is rotatable in the enlargement 8 to dispose the boss transversely of the slot, the stem being slidable in the slot 7, longitudinally thereof, to dispose the stem 2 and the boss 5 at one end of the slot 7, as shown in Figures 3 and 5, the stem 2 then being held in the slot 7, against rotation.

The construction, obviously, is such that although the head 6 may be mounted readily on the stem 2, it will be exceedingly difficult for the stem and the head to become separated. No attempt has been made to show the device embodied in a collar button, a badge or anything of the sort, since these details are left to the manufacturer, the essential features of the invention residing in the construction shown, rather than in the proposed use.

A plate 9 may be secured to the base 1, the stem 2 passing through the plate, the plate being bent upon itself to form double-walled wings 10, located on opposite sides of the stem 2. The wings 10 are adapted to be received in a button hole, to prevent the base 1 from rotating, thereby facilitating the mounting of the head 6 on the stem 2, and to aid in preventing an accidental detachment of the head from the stem.

Although the wings 10 may be desirable under some circumstances, they may be omitted if preferred. Thus, as shown in Figure 6, the wings have been omitted, parts hereinbefore described having been designated by numerals previously used, with the suffix "a".

In connection with breeches and other articles, the construction delineated in Figure 7 will be found desirable. In that Figure, parts hereinbefore described have been designated by numerals previously used, with the suffix "b". In this form, the boss 5b is disposed relatively near to the outer ends of the wings 10b, and the wings are spaced, at any desired distance, from the stem 2b. The construction is such that, when the head 6 is mounted on the boss 5ᵇ, the wings 10ᵇ will be in contact with the cloth through which the stem 2ᵇ passes, the wings 10ᵇ being spaced sufficiently from the stem 2ᵇ so that the cloth may be distorted slightly, and be engaged between the outer ends of the wings 10ᵇ and the stem 2ᵇ.

What is claimed is:—

1. In a device of the class described, a base, a stem of rectangular cross section projecting from the base, and of unequal transverse dimensions, the stem terminating in a boss disposed at right angles to the longer transverse dimension of the stem, and a head provided with an elongated slot having an enlargement, the width of the slot being substantially equal to the shorter transverse dimension of the stem, the boss being insertible into the slot when the stem is located in the enlargement with the longer transverse dimension of the stem disposed at right angles to the length of the slot, the stem being rotatable in the enlargement to dispose the boss transversely of the slot, and being slidable in the slot, longitudinally thereof, to dispose the stem and the boss at one end of the slot, the stem then being held on the slot against rotation.

2. A device of the class described, constructed as set forth in claim 1, and further characterized by the fact that the base is provided with wings projecting in the same direction as the stem and located on opposite sides of the stem.

3. In a device of the class described, a base, a stem projecting from the base and terminating in a boss, and a head having a slot for the reception of said boss, the slot being provided with an enlargement wherein the stem is rotatable to dispose the boss transversely of the slot, said base being provided with independent projecting wings located on and spaced from opposite sides of the stem.

In testimony that I claim the foregoing as my own, I have hereto affixed my signature in the presence of two witnesses.

WILLIAM CROTTY.

Witnesses:
  CLARENCE KLING,
  HERMAN MILLER.